United States Patent [19]
Diemer

[11] Patent Number: 5,494,353
[45] Date of Patent: Feb. 27, 1996

[54] RADIAL BEARING ASSEMBLY

[75] Inventor: Karl Diemer, Idstein, Germany

[73] Assignee: The Torrington Company, Torrington, Conn.

[21] Appl. No.: 298,994

[22] Filed: Aug. 31, 1994

[30] Foreign Application Priority Data

Jun. 28, 1994 [DE] Germany ............... 44 22 662.4

[51] Int. Cl.⁶ ................................................. F16C 31/04
[52] U.S. Cl. .......................... 384/10; 384/2; 384/49
[58] Field of Search ...................... 384/49, 2, 10, 384/54, 57, 59

[56] References Cited

U.S. PATENT DOCUMENTS

| | | |
|---|---|---|
| 1,281,245 | 10/1918 | Pruyn . |
| 1,550,265 | 8/1925 | Knippel . |
| 1,946,652 | 2/1934 | Wallgren . |
| 2,331,756 | 10/1943 | Zobel . |
| 2,333,970 | 11/1943 | Annen . |
| 2,617,509 | 11/1952 | Britton . |
| 2,858,173 | 10/1958 | Leibach . |
| 2,903,908 | 9/1959 | Adams et al. . |
| 3,007,748 | 11/1961 | Firth . |
| 4,961,650 | 8/1995 | Schwarzbich ............... 384/49 |

FOREIGN PATENT DOCUMENTS

| | | |
|---|---|---|
| 171253 | 10/1905 | Germany . |
| 352479 | 4/1922 | Germany . |
| 503540 | 7/1930 | Germany . |
| 844233 | 7/1949 | Germany . |
| 923631 | 12/1954 | Germany . |
| 8326183 | 12/1983 | Germany . |

*Primary Examiner*—Lenard A. Footland
*Attorney, Agent, or Firm*—John C. Bigler

[57] ABSTRACT

A bearing body is provided with first roller bodies such that a shaft may be rollably bearing-mounted on the surface of the first roller bodies, for centering the shaft such that the shaft is shiftable along the shaft axis, rotatable about the shaft axis, and swivelable with respect to a central axis of the bearing. The first roller bodies may be balls and may, in turn, be rollably bearing-mounted by second roller bodies. The bearing assembly achieves a device having zero runout and low friction that ensures a smooth, reliable bearing for shafts and rods, for example, in the gear shift rods of motor vehicles.

17 Claims, 3 Drawing Sheets

RADIAL BEARING ASSEMBLY

BACKGROUND OF THE INVENTION

The present invention relates generally to a radial bearing assembly having a bearing body with a means of centering a shaft and, more particularly, to a bearing assembly allowing the shaft to be movable along the axis of the shaft and swivelable towards the central axis of the bearing assembly, as well as rotatable about the shaft axis, for mounting of gear shift rods in motor vehicles, for example.

For rotatable shafts and rods capable of axial movements and subjected to angular displacements, the bearing assembly is highly complicated. Radial bearings are known which feature balls drill-holed through the center which are slide-mounted in ball cups, a shaft or rod being shiftably slide-mounted in the central drill-hole. In this arrangement, the shaft is able to execute longitudinal and rotary movements and is swivelable with respect to the bearing body carrying the ball cups by rotating the through-drilled ball. The sliding bearing assembly is a well-functioning solution which is subject to very high wear, however, due to the sliding friction which is influenced among other things also by the material pairing and preloading employed.

The foregoing and other aspects will become apparent from the following detailed description of the invention when considered in conjunction with the accompanying drawing figures.

SUMMARY OF THE INVENTION

In one aspect of the invention, this is accomplished by providing a radial bearing assembly comprising a bearing body and a means for centering a shaft such that the shaft is shiftable along the shaft axis, rotatable about the shaft axis, and swivelable with respect to a central axis of the bearing. The centering means is provided with first roller bodies, with respect to the surface of which said shaft is rollably bearing-mounted.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
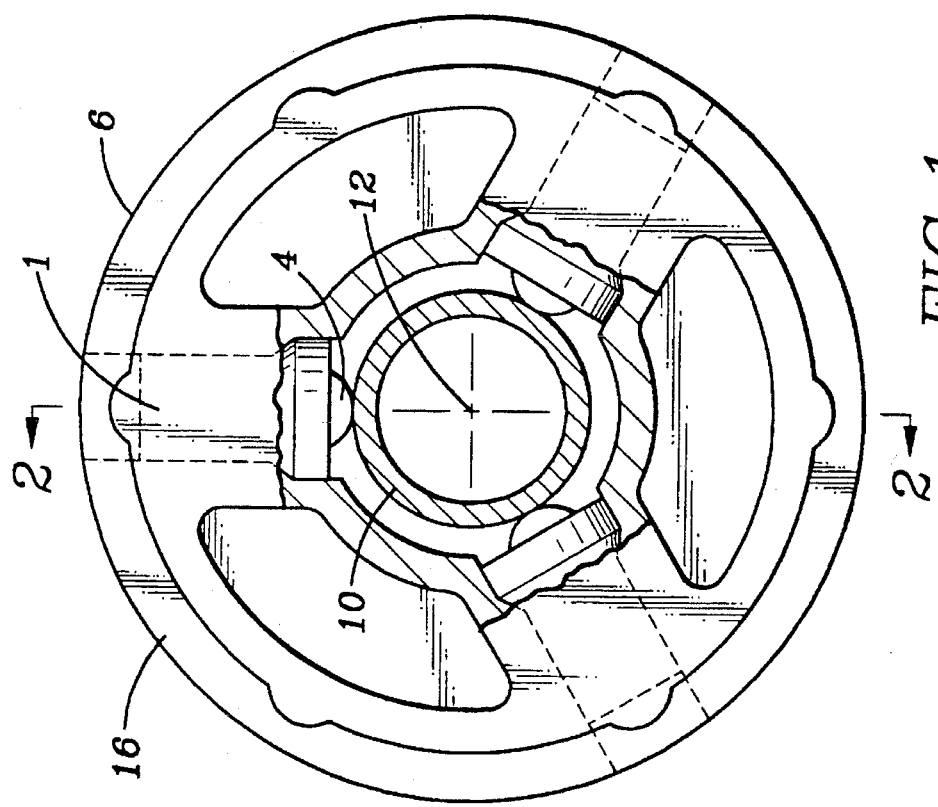
FIG. 1 is an end view illustrating one embodiment of the radial bearing assembly according to the present invention.

Referring now to the drawings, FIG. 1 illustrates shaft 10, in section, as a hollow shaft arranged among three first balls 4, located about a central axis 12, directed out of the plane of the drawing. First balls 4 in this embodiment are arranged in ball guiding members 1, that are illustrated in detail in FIG. 2. Ball guiding members 1 are embedded star-shaped in bearing body 6 that may be mounted in a shift rod housing, for example. As apparent from FIG. 1, shaft 10 is rotatable about central axis 12, is shiftable axially along central axis 12, and is swivelable with respect to central axis 12.

Figure 2:
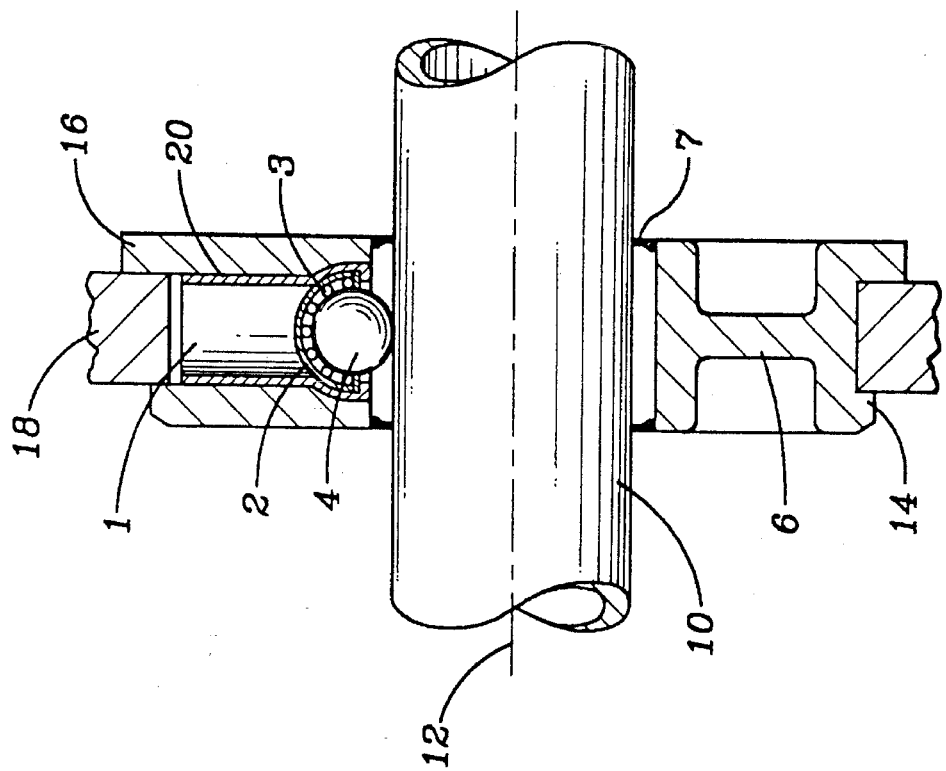
FIG. 2 is a sectional view of the radial bearing assembly of FIG. 1, taken along the line 2—2.

FIG. 2, a sectional view taken along the line 2—2 of FIG. 1, shows shaft 10 as a hollow shaft positioned concentrically about central axis 12 and centered in bearing body 6 by first balls 4. Bearing body 6 has ring-shaped flange 16 on the right-hand side of FIG. 2 and has projections 14 on the left-hand side, equidistantly spaced on the periphery of the left-hand side bearing body wall, as shown in FIG. 1. The arrangement of bearing body 6 in housing or shift component 18 is indicated merely schematically.

The practical use of such a radial bearing assembly may be visualized, for example, by shaft 10 being actuated at an end point rotatably, swivelably and shiftably with respect to central axis 12, a corresponding swivel movement shifting the assembly, shown in FIG. 2, of bearing body 6 and shift component 18 in a plane perpendicular to central axis 12, shaft 10 swivelling away through an angle from central axis 12. Between bearing body 6 and shaft 10, ring-shaped seals 7 are arranged which seal off the surroundings from the space between the two ring-shaped seals 7, even when the swivelling occurs.

In the upper half of FIG. 2, first ball 4 is shown surrounded by second balls 3, that in turn are encompassed by domed member 2. Between first ball 4 and domed member 2, second balls 3 are spaced sufficiently to prevent first ball 4 and second balls 3 from obstructing each other and thus causing unnecessary friction. Ball guiding member 1 has sleeve 20 that carries domed member 2. Sleeve 20, before shaft 10 is introduced through the central opening of bearing body 6, is introduced radially outward from this central opening in corresponding recesses in bearing body 6 and there firmly located.

Bearing body 6 may be made completely or partly of a resilient material such as natural or synthetic rubber, with or without a spring steel insert, or of plastic. If bearing body 6 is resilient in the region of projections 14, bearing body 6 may be introduced in shift component 18 shown in FIG. 2, for example, from the right, so that the projections on the side opposite ring-shaped flange 16 of bearing body 6 come into resilient contact within shift component 18 to firmly locate the bearing body there. This resilient embodiment of bearing body 6 has significant advantages with respect to the damping behavior of the assembly.

Figure 3:
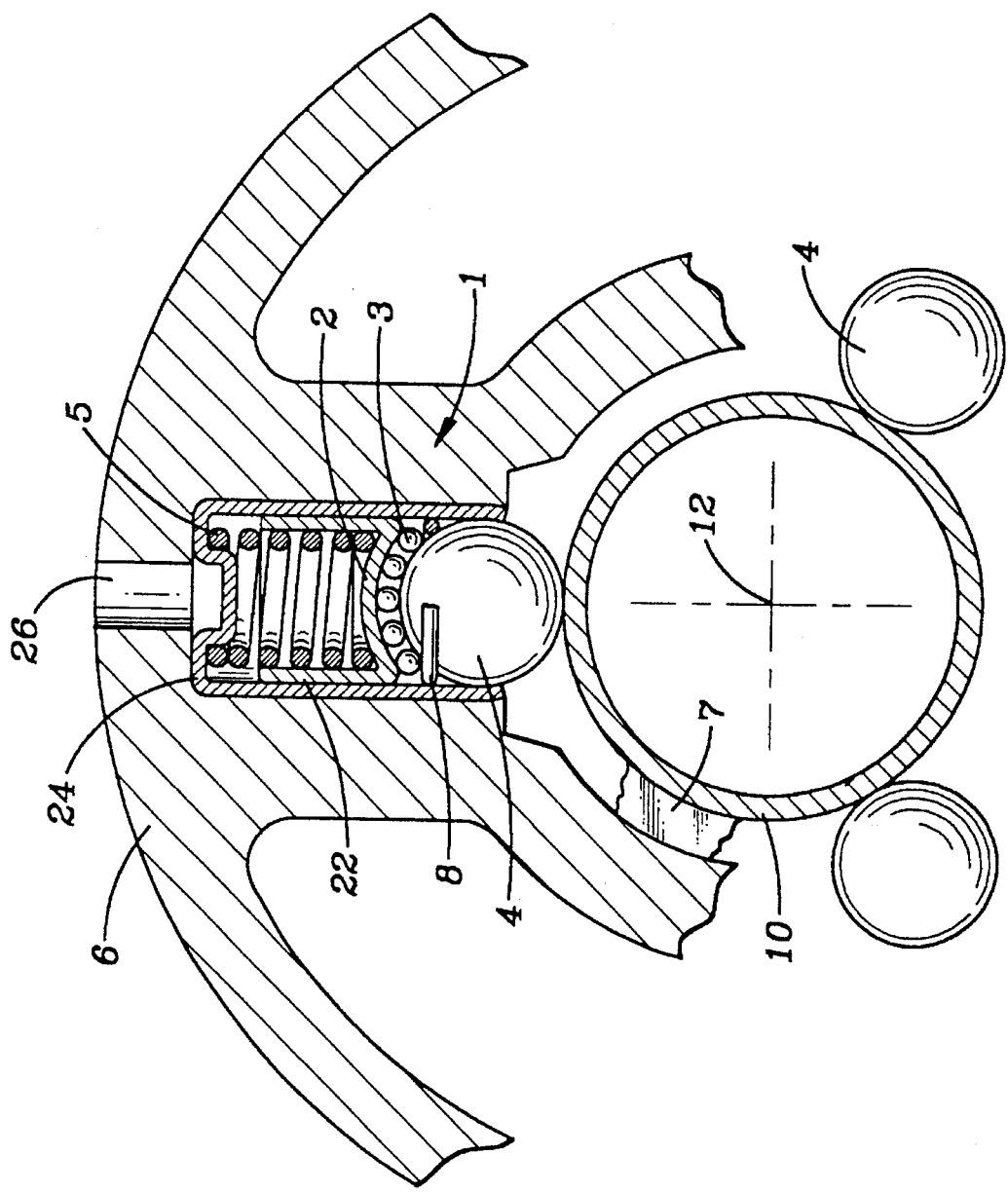
FIG. 3 is a cutaway end view of portions of the radial bearing assembly of FIG. 1.

FIG. 3 is a cutaway view showing an embodiment of the present invention having a variation of ball guiding member 1 in bearing body 6 of a radial bearing assembly, bearing body 6 being depicted only in part. In this arrangement, similar to the arrangement of FIG. 1, three ball guiding members 1 are provided, disposed at 120° about the central axis. Since all three members are identical, only one of them is shown. Ball guiding member 1 of FIG. 3 is provided with shroud sleeve 24 extending inwardly in the direction of central axis 12.

At the end of shroud sleeve 24 facing the shaft, first ball 4 is surrounded by the shroud sleeve in such a way that first ball 4 is unable to fall out of the shroud sleeve, if shaft 10, shown here in the operating position, were to be removed. First ball 4 is maintained substantially in the position as shown by a plurality of second balls 3 supported by domed member 2, that is in turn supported by the end of shroud sleeve 24 remote from central axis 12 via spring member 5. When first ball 4 turns on second balls 3, a certain number of balls 3 is not loaded and move into free spaces between the balls, such that first ball 4 is evenly supported.

In a departure from prior art, separating member 8 is provided, in this case in the form of a wire ring, which prevents balls 3 from taking up the space occupied by separating member 8, where they would otherwise jam in the ring-shaped gap between the inner side of shroud sleeve 24 and the surface of first ball. 4 and thus prevent rolling of first ball 4 on second balls 3. By employing separating member 8 in ball guiding member 1, a rolling bearing is assured. Ball guiding member 1 shown in FIG. 3 may be a compact closed assembly which, when shaft 10 is removed, is introduced from the central opening of bearing body 6 into the position as shown.

The arrangement of FIG. 3 represents a low-cost radial bearing assembly which functions very simply and reliably. If desired, ball guiding member 1 may be radially adjustable in its position, the respective recess of bearing body 6 and the shroud sleeve outer surface being provided, for instance, with mating threads, and the bottom of shroud sleeve 24 being provided with surfaces for engaging a corresponding tool inserted through ,opening 26 for turning ball guiding member 1.

Figure 5:
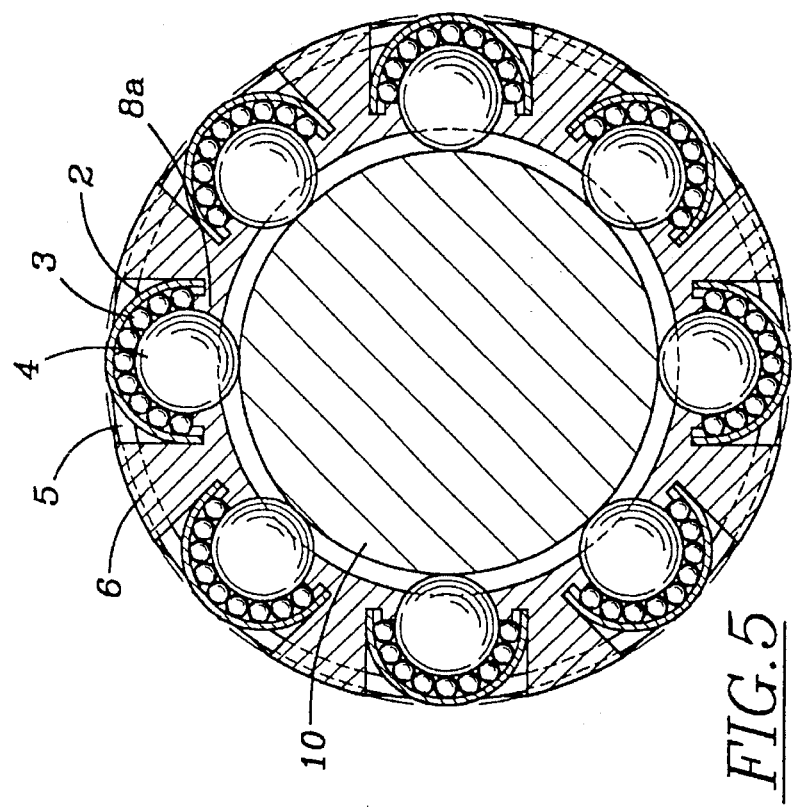
FIG. 5 is a cross section of the embodiment of FIG. 4, taken along the line 5—5.
Figure 4:
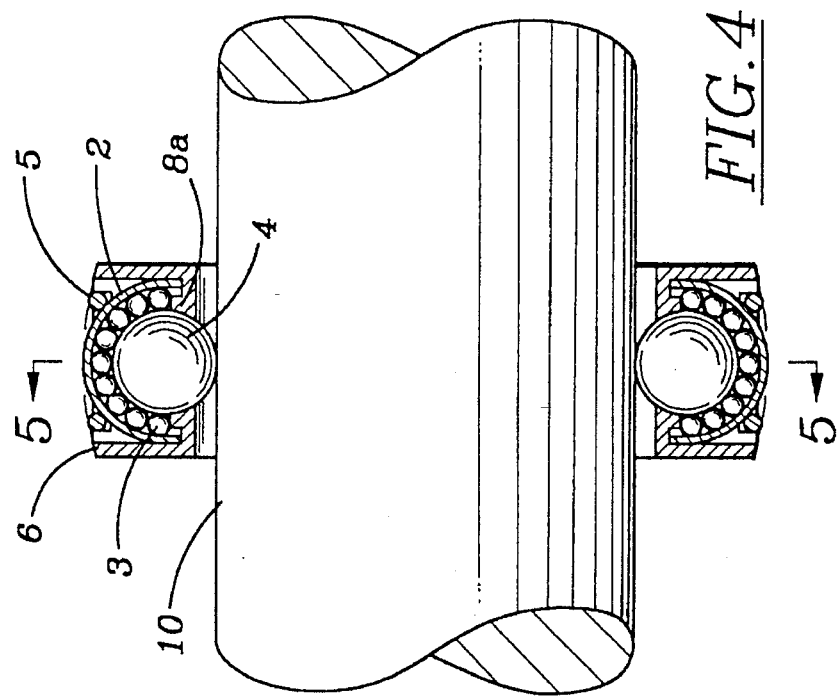
FIG. 4 is a sectional view illustrating portions of another embodiment of the radial bearing assembly of the present invention.

FIGS. 4 and 5 show yet another embodiment of the radial bearing assembly according to the present invention, in which more than three first balls 4, namely eight balls, are provided for centering shaft 10 in bearing member 6. In this embodiment, it is advantageous to configure bearing body 6, as shown in section in FIG. 4, with a ring-shaped central opening with holes extending from the outside radially inward at every location at which a first ball 4 is to be arranged, to permit a partial protrusion of the balls 4. First balls 4 are then surrounded by domed members 2 which together with second balls 3 encompass first balls 4.

The arrangement and nature of spring member 5 for forcing first balls 4 in the direction of the central axis differs from the device described with respect to FIGS. 1 through 3. In the embodiment of FIGS. 4 and 5, domed members 2 are encompassed by ring-shaped spring members 5, each of which in common preloads all domed members 2 with respect to shaft 10. This arrangement of spring members 5 allows a space-saving configuration. In this case also, for instance, separating member 8a may be integral with bearing body 6, as shown in FIG. 4. Not shown in FIG. 4, but also applicable in this case, are seals 7 as described above.

FIG. 5 depicts a radial bearing assembly with eight first balls 4, merely by way of an example. Embodiments with more or less first balls 4 may be selected, for particular applications, depending on the size of the radial bearing assembly and the intended purpose. Here also, bearing body 6 may be made of rubber or other material for damping purposes or surrounded by a rubber damping ring.

Also intended is an embodiment of bearing body 6 made of polyamide or die-cast, with first and second balls 3 and 4 and domed members 2 being radially preloaded, following insertion, via two supporting spring rings 5, prior to bearing body 6 being inserted in a sheet-metal or rubber housing. Also, in the radial bearing assembly shown in FIG. 5, providing seals 7, as described above, is feasible. By suitably configuring bearing body 6 and spring members 5 arranged therein the spring and damping properties are freely selectable.

The radial bearing assembly of the present invention has first roller bodies, on the surface of which the shaft is rollably mounted, thereby greatly reducing the friction coefficient between shaft and bearing. The friction occurs merely as rolling friction, providing a substantially smoother movement of the shaft than afforded by a sliding friction pairing. In this arrangement, the first roller bodies may be slidably bearing mounted in a ball cup, for example. A further substantial reduction in friction is achieved by mounting of the first roller bodies in second roller bodies, resulting in only rolling friction in the bearing.

As an additional feature of the present invention, each of the first roller bodies may be brought into resilient contact with the shaft This resilient contact achieves a "softer" smoother actuation of the shaft with respect to the bearing assembly and/or component in which the bearing assembly is incorporated. Resilient contact with the shaft is achieved, for example, by the bearing body itself having a resilient configuration or by the first roller bodies being brought into contact with the shaft by spring members.

With the present invention, zero runout is possible with large swivel movements of the shaft with respect to the bearing body without an increase of friction of the roller bearing mount. Also, if preloading of the shaft in the radial bearing is required, the spring members may be made adjustable in the bearing body to effect a predetermined preload. Although balls may be employed expediently as rolling bodies in the radial bearing assembly of the present invention, it is possible to configure the second roller bodies as rollers or barrel-shaped roller bodies and the like, for example.

In one of the described embodiments of the present invention, each of the second balls is rollably arranged on the concave side of a domed member movably arranged radially in the bearing body. In this arrangement, it is expedient to employ conventional ball guiding members and second balls, which are otherwise substantially smaller than the first balls, arranged between the first ball and the domed member. As a result, the second balls that momentarily have no supporting function are able to roll in each of the free spaces available, thus making infinite further rolling of the first ball possible.

A conventional ball guiding member may be used, having a spring member arranged on the convex side of the domed member and encompassed by a sleeve mounted in a shroud sleeve, extending in the direction of the central axis past the center of the first ball and constricted at that end towards the surface of the first ball. In that case, a separating member may be provided between the domed member and the first ball to prevent the second balls from contacting the inner wall of the shroud sleeve and jamming in the circular gap between the first ball and the inner wall of the shroud sleeve. The separating member may be a separate wire ring or a depression or shoulder machined into the shroud sleeve, for example.

Preferably, the bearing assembly is equipped with three first roller bodies, since that number best assures explicit definition of the bearing and reliably prevents overdesigning. In addition to actuation of the shaft with zero runout and low friction, damping may be achieved by having the bearing bodies made fully or partly of a resilient material. Sealing the roller bodies from the shaft enhances reliable functioning and maintains a high useful life of the bearing assembly. The bearing assembly may be preassembled with the shaft, prelubricated and sealed-for-life as a single assembly.

From the above description, it will be apparent that the present invention provides a radial bearing assembly permitting longitudinal, rotational and angular movement of a shaft bearing-mounted therein, which has low friction and zero runout. Further features and embodiments of the invention will be apparent from the following claims.

Having described the invention, what is claimed is:

1. A radial bearing assembly comprising:
   a bearing body; and
   centering means for centering a shaft such that the shaft is shiftable along the shaft axis, rotatable about the shaft axis, and swivelable with respect to a central axis of the bearing;
   said centering means being provided with first rolling bodies, with respect to the surface of which said shaft is rollably bearing-mounted.

2. The bearing assembly according to claim 1, wherein the number of the first rolling bodies is three.

3. The bearing assembly according to claim 1, wherein each of the first rolling bodies is forced into resilient contact with the shaft.

4. The bearing assembly according to claim 1, wherein the first rolling bodies are forced into contact with the shaft by spring members.

5. The bearing assembly according to claim 4, wherein the spring members are arranged so as to be adjustable in the bearing body.

6. The bearing assembly according to claim 1, wherein the first rolling bodies are in turn rolling bearing-mounted by second rolling bodies.

7. The bearing assembly according to claim 6, wherein the second rolling bodies bearing-mounting the first rolling bodies are balls, each ball being rollably arranged on the concave side of a domed member, the domed member being radially movable in the bearing body.

8. The bearing assembly according to claim 7, wherein a spring member is arranged on the convex side of the domed member such that the spring member preloads the respective domed member radially in the direction of the central axis of the bearing.

9. The bearing assembly according to claim 8, wherein the spring member is encompassed by a sleeve connected to the domed member.

10. The bearing assembly according to claim 9, wherein the sleeve is slidably mounted in a shroud sleeve which at its end remote from the central axis of the bearing supports the spring member and extends from there in the direction of the central axis beyond the center of the respective first ball and is constricted at that end towards the surface of the first ball.

11. The bearing assembly according to claim 10, wherein a separating member is arranged between the domed member and the respective first ball which prevents contact of the second rolling bodies with the inner wall of said shroud sleeve.

12. The bearing assembly according to claim 8, wherein the spring member is configured in one or more parts and preloads all domed members of the bearing assembly.

13. The bearing assembly according to claim 10, wherein the separating member is a wire ring.

14. The bearing assembly according to claim 1, wherein the first rolling bodies are balls.

15. The bearing assembly according to claim 1, wherein the bearing body consists, at least in part, of a resilient material.

16. The bearing assembly according to claim 1, wherein the rolling bodies are sealed off from surroundings by a seal positioned about the shaft.

17. The bearing assembly according to claim 16, wherein the bearing assembly is assembled as a prelubricated assembly, ready for installation.

* * * * *